United States Patent
Bargh et al.

(10) Patent No.: US 7,644,370 B2
(45) Date of Patent: Jan. 5, 2010

(54) METHOD OF COMPONENTISATION OF A GRAPHICALLY DEFINED FORMULA

(75) Inventors: Christopher Ian Bargh, Scarborough, WA (US); Gregory Owen Johnston, Bicton, WA (US); Russell Benedict Jones, Subiaco, WA (US)

(73) Assignee: Xemplex Pty Ltd., Perth (AU)

( * ) Notice: Subject to any disclaimer, the term of this patent is extended or adjusted under 35 U.S.C. 154(b) by 485 days.

(21) Appl. No.: 11/141,991

(22) Filed: May 31, 2005

(65) Prior Publication Data

US 2006/0271908 A1 Nov. 30, 2006

Related U.S. Application Data

(63) Continuation of application No. PCT/AU03/01608, filed on Dec. 2, 2003.

(30) Foreign Application Priority Data

Dec. 2, 2002 (AU) ............................. 2002953011

(51) Int. Cl.
*G06F 3/00* (2006.01)
(52) U.S. Cl. ...................................... 715/771
(58) Field of Classification Search .................. 715/771
See application file for complete search history.

(56) References Cited

U.S. PATENT DOCUMENTS

| | | | | |
|---|---|---|---|---|
| 4,024,708 A | * | 5/1977 | Takemoto | ................ 60/278 |
| 5,301,336 A | * | 4/1994 | Kodosky et al. | ............ 715/846 |
| 5,481,741 A | * | 1/1996 | McKaskle et al. | ........... 345/522 |
| 5,546,507 A | * | 8/1996 | Staub | .......................... 706/60 |
| 7,480,906 B2 | * | 1/2009 | Joffrain et al. | ............. 717/171 |
| 2003/0051059 A1 | * | 3/2003 | Zondervan et al. | .......... 709/250 |

FOREIGN PATENT DOCUMENTS

WO    WO 02/17074    2/2002

* cited by examiner

*Primary Examiner*—Ryan F Pitaro
(74) *Attorney, Agent, or Firm*—Knobbe Martens Olson & Bear LLP

(57) ABSTRACT

A computer implemented method of graphically defining a formula comprises the steps of:
  providing a graphically defined formula including one or more objects that graphically define the formula;
  selecting one or more of the objects to be grouped into a new component object;
  determining the number of connections that provide an input to the selected objects;
  determining the number of connections that provide an output to the selected objects;
  determining a graphical definition of the formula, where the selected objects are replaced with a representation of the new component object having the determined number of inputs and the determined number of outputs, connection(s) inputting to the selected objects from other objects are replaced with connection(s) connecting to the input(s) of the new component object and connection(s) outputting from the selected objects to the other objects are replaced with connection(s) connecting from the output(s) of the new component object; and
  determining a logical definition of the formula, where the selected objects are retained in the logical definition.

35 Claims, 7 Drawing Sheets

METHOD OF COMPONENTISATION OF A GRAPHICALLY DEFINED FORMULA

RELATED APPLICATIONS

This application is a continuation application, and claims the benefit under 35 U.S.C. §§ 120 and 365 of PCT Application No. PCT/AU03/01608, filed on Dec. 2, 2003, which also claimed priority from Australian Provisional Application No. 2002953011, filed on Dec. 2, 2002, each of which is hereby incorporated by reference.

FIELD OF THE INVENTION

The present invention relates to a method of componentising a graphically defined formula for manipulating data to produce a result.

BACKGROUND

The inventors of the method of graphically defining a formula described in International Patent Application No. PCT/AU01/01053 (WO 02/17074) have developed an improvement to this invention.

It is to be understood that, if any prior art publication is referred to herein, such reference does not constitute an admission that the publication forms a part of the common general knowledge in the art, in Australia or any other country.

BRIEF SUMMARY OF THE INVENTION

According to a first aspect of the present invention there is provided a computer implemented method of graphically defining a formula, said method comprising at least the steps of:
  providing a graphically defined formula including one or more objects that graphically define the formula;
  selecting one or more of the objects to be grouped into a new component object;
  determining the number of connections that provide an input to the selected objects;
  determining the number of connections that provide an output to the selected objects;
  determining a graphical definition of the formula, where the selected objects are replaced with a representation of the new component object having the determined number of inputs and the determined number of outputs, connection(s) inputting to the selected objects from other objects are replaced with connection(s) connecting to the input(s) of the new component object and connection(s) outputting from the selected objects to the other objects are replaced with connection(s) connecting from the output(s) of the new component object;
  determining a logical definition of the formula, where the selected objects are retained in the logical definition; and
  determining the input/output properties of connections that connect to the selected objects, and providing each input of the new component object with the properties of the corresponding connection inputting the selected objects and providing each output of the new component object with the properties of the corresponding connection outputting from the selected objects.

According to a second aspect of the present invention there is provided a method of componentising a portion of a graphically defined formula comprising at least the steps of:
  providing a graphically defined formula including a plurality of objects that graphically define the formula, the graphically defined formula having a logical definition and a graphical definition;
  selecting one or more of the objects to be grouped into a new component object;
  determining the number of connections that provide an input to the selected objects;
  determining the number of connections that provide an output to the selected objects;
  changing the graphical definition to replace the selected objects with a representation of the new component object having the determined number of inputs and the determined number of outputs, changing connection(s) inputting to the selected objects from other objects into the connection(s) connecting to the input(s) of the new component object and changing connection(s) outputting from the selected objects to the other objects into connection(s) connecting to the output(s) of the new component object;
  changing the logical definition to reflect the connections between the new component object and the selected components; and
  determining the input/output properties of connections that connect to the selected objects, and providing each input of the new component object with the properties of the corresponding connection inputting the selected objects and providing each output of the new component object with the properties of the corresponding connection outputting from the selected objects.

According to a third aspect of the present invention there is provided a method of defining a new component type of a graphically defined formula, comprising at least:
  providing a graphically defined formula including one or more objects that graphically define the formula, the graphically defined formula having a logical definition and a graphical definition;
  selecting one or more of the objects to be included in the functionality of the new component type;
  determining the number of connections that provide an input to the selected objects;
  determining the number of connections that provide an output to the selected objects;
  determining an interface definition to the new component type, which defines how an instance (a new component object) of the new component type interacts with other objects in the graphically defined formula;
  determining a graphical definition of the new component type, which includes a representation of the new component object having the determined number of inputs and the determined number of outputs;
  determining a logical definition of the new component type, which includes the logical definition of the selected components; and
  determining the input/output properties of connections that connect to the selected objects, and providing each input of the new component type with the properties of the corresponding connection inputting the selected objects and providing each output of the new component type with the properties of the corresponding connection outputting from the selected objects.

Preferably the objects are one or more of components, variables or connections therebetween.

Preferably the abovementioned method includes storing a graphical definition of the replaced selected objects as a sub-set of the graphical definition of the formula or new component type. Preferably the sub-set is defined to display the selected objects on a separate page to that of the new component.

Preferably the selected objects are moved to a different hierarchical level in the logical definition. Preferably the logical definition includes linking the selected objects to the different hierarchical levels of the logical definition such that the logical definition is logically/mathematically/functionally equivalent to a previous logical definition.

Preferably the method includes a step of determining the input/output properties of connections that connect to the selected objects, and providing each input of the new component object/type with the properties of the corresponding connection inputting the selected objects and providing each output of the new component object/type with the properties of the corresponding connection outputting from the selected objects.

Preferably the new component object is re-useable elsewhere in the formula. Preferably the new component is re-useable in another graphically defined formula.

Preferably the new component is a new type of component.

Preferably the new component type is re-useable elsewhere in the formula or in another graphically defined formula.

Preferably the new component type may be graphically re-defined, by graphically modifying the inner graphical definition, which in turn results in changes to its logical definition. Preferably when the component type is redefined all instances of the component will reflect the change made in the re-definition. Alternatively version information is recorded with each change to the component type definition for allowing selection of a version of the component type definition in each instance of the component.

According to a fourth aspect of the present invention there is provided a computer program for controlling a computer to perform any of the abovementioned methods.

According to a fifth aspect of the present invention there is provided a computer readable medium for storing a computer program as defined above.

According to a sixth aspect of the present invention there is provided a system for graphically defining a formula comprising means for conducting any of the above defined methods.

According to a seventh aspect of the present invention there is provided a system for graphically defining a formula comprising:
  means for providing a graphically defined formula including a plurality of objects that graphically define the formula, the graphically defined formula having a logical definition and a graphical definition;
  means for selecting one or more of the objects to be grouped into a new component object;
  means for determining the number of connections that provide an input to the selected objects;
  means for determining the number of connections that provide an output to the selected objects;
  means for changing the graphical definition to replace the selected objects with a representation of the new component object having the determined number of inputs and the determined number of outputs, changing connection(s) inputting to the selected objects from other objects into the connection(s) connecting to the input(s) of the new component object and changing connection(s) outputting from the selected objects to the other objects into connection(s) connecting to the output(s) of the new component object;
  means for changing the logical definition to reflect the connections between the new component object and the selected components; and
  means for determining the input/output properties of connections that connect to the selected objects, and providing each input of the new component object with the properties of the corresponding connection inputting the selected objects and providing each output of the new component object with the properties of the corresponding connection outputting from the selected objects.

According to an eight aspect of the present invention there is provided a method of componentising a portion of a graphically defined formula comprising at least the steps of:
  providing a graphically defined formula including a plurality of objects that graphically define the formula, the graphically defined formula having a logical definition and a graphical definition, wherein the graphically defined formula includes a plurality of variable name objects that represent a logical connection to another object and at least two of the variable objects have the same name;
  selecting one or more of the objects to be grouped into a new component object;
  determining the number of graphical connections that provide an input to the selected objects, wherein inputs to named variable objects which have the same name are represented by a single graphical input;
  determining the number of graphical connections that provide an output to the selected objects, wherein outputs to named variable objects which have the same name are represented by a single graphical output;
  changing the graphical definition to replace the selected objects with a representation of the new component object having the determined number of inputs and the determined number of outputs, changing connection(s) inputting to the selected objects from other objects into the connection(s) connecting to the input(s) of the new component object and changing connection(s) outputting from the selected objects to the other objects into connection(s) connecting to the output(s) of the new component object; and
  changing the logical definition to reflect the connections between the new component object and the selected components.

According to a ninth aspect of the present invention there is provided a method of defining a new component type of a graphically defined formula, comprising at least:
  providing a graphically defined formula including a plurality of objects that graphically define the formula, the graphically defined formula having a logical definition and a graphical definition, wherein the graphically defined formula includes a plurality of variable name objects that represent a logical connection to another object and at least two of the variable objects have the same name;
  selecting one or more of the objects to be included in the functionality of the new component type;
  determining the number of graphical connections that provide an input to the selected objects, wherein inputs to named variable objects which have the same name are represented by a single graphical input;
  determining the number of graphical connections that provide an output to the selected objects, wherein outputs to named variable objects which have the same name are represented by a single graphical output;
  determining an interface definition to the new component type, which defines how an instance (a new component object) of the new component type interacts with other objects in the graphically defined formula;
  determining a graphical definition of the new component type, which includes a representation of the new component object having the determined number of inputs and the determined number of outputs; and determining a logical definition of the new component type, which includes the logical definition of the selected components.

According to a tenth aspect of the present invention there is provided a computer program for controlling a computer to perform a method of graphically defining a formula, said computer program comprising computer executable instructions for controlling the computer to undertake at least the steps of:
- providing a graphically defined formula including a plurality of objects that graphically define the formula, wherein the graphically defined formula includes a plurality of variable name objects that represent a logical connection to another object and at least two of the variable objects have the same name;
- selecting one or more of the objects to be grouped into a new component object;
- determining the number of graphical connections that provide an input to the selected objects, wherein inputs to named variable objects which have the same name are represented by a single graphical input;
- determining the number of graphical connections that provide an output to the selected objects, wherein outputs to named variable objects which have the same name are represented by a single graphical output;
- determining a graphical definition of the formula, where the selected objects are replaced with a representation of the new component object having the determined number of inputs and the determined number of outputs, connection(s) inputting to the selected objects from other objects are replaced with connection(s) connecting to the input(s) of the new component object and connection(s) outputting from the selected objects to the other objects are replaced with connection(s) connecting from the output(s) of the new component object; and
- determining a logical definition of the formula, where the selected objects are retained in the logical definition.

According to a eleventh aspect of the present invention there is provided a computer program for controlling a computer to perform a method of componentising a portion of a graphically defined formula, said computer program comprising computer executable instructions for controlling the computer to undertake at least the steps of:
- providing a graphically defined formula including a plurality of objects that graphically define the formula, the graphically defined formula having a logical definition and a graphical definition, wherein the graphically defined formula includes a plurality of variable name objects that represent a logical connection to another object and at least two of the variable objects have the same name;
- selecting one or more of the objects to be grouped into a new component object;
- determining the number of graphical connections that provide an input to the selected objects, wherein inputs to named variable objects which have the same name are represented by a single graphical input;
- determining the number of graphical connections that provide an output to the selected objects, wherein outputs to named variable objects which have the same name are represented by a single graphical output;
- changing the graphical definition to replace the selected objects with a representation of the new component object having the determined number of inputs and the determined number of outputs, changing connection(s) inputting to the selected objects from other objects into the connection(s) connecting to the input(s) of the new component object and changing connection(s) outputting from the selected objects to the other objects into connection(s) connecting to the output(s) of the new component object; and
- changing the logical definition to reflect the connections between the new component object and the selected components.

According to a twelfth aspect of the present invention there is provided a computer program for controlling a computer to perform a method of defining a new component type of a graphically defined formula, said computer program comprising computer executable instructions for controlling the computer to undertake at least the steps of:
- providing a graphically defined formula including a plurality of objects that graphically define the formula, the graphically defined formula having a logical definition and a graphical definition, wherein the graphically defined formula includes a plurality of variable name objects that represent a logical connection to another object and at least two of the variable objects have the same name;
- selecting one or more of the objects to be included in the functionality of the new component type;
- determining the number of graphical connections that provide an input to the selected objects, wherein inputs to named variable objects which have the same name are represented by a single graphical input;
- determining the number of graphical connections that provide an output to the selected objects, wherein outputs to named variable objects which have the same name are represented by a single graphical output;
- determining an interface definition to the new component type, which defines how an instance (a new component object) of the new component type interacts with other objects in the graphically defined formula;
- determining a graphical definition of the new component type, which includes a representation of the new component object having the determined number of inputs and the determined number of outputs; and
- determining a logical definition of the new component type, which includes the logical definition of the selected components.

According to a thirteenth aspect of the present invention there is provided a system for graphically defining a formula comprising:
- means for providing a graphically defined formula including a plurality of objects that graphically define the formula, the graphically defined formula having a logical definition and a graphical definition, wherein the graphically defined formula includes a plurality of variable name objects that represent a logical connection to another object and at least two of the variable objects have the same name;
- means for selecting a plurality of the objects to be grouped into a new component object;
- means for determining the number of graphical connections that provide an input to the selected objects, wherein inputs to named variable objects which have the same name are represented by a single graphical input;
- means for determining the number of graphical connections that provide an output to the selected objects, wherein outputs to named variable objects which have the same name are represented by a single graphical output;
- means for changing the graphical definition to replace the selected objects with a representation of the new component object having the determined number of inputs and the determined number of outputs, changing connection(s) inputting to the selected objects from other objects into the connection(s) connecting to the input(s) of the new component object and changing connection(s) outputting from the selected objects to the other objects into connection(s) connecting to the output(s) of the new component object; and means for changing the logical definition to reflect the connections between the new component object and the selected components.

According to a fourteenth aspect of the present invention there is provided a system for graphically defining a formula comprising:

means for providing a graphically defined formula including one or more objects that graphically define the formula, the graphically defined formula having a logical definition and a graphical definition, wherein the graphically defined formula includes a plurality of variable name objects that represent a logical connection to another object and at least two of the variable objects have the same name;

means for selecting one or more of the objects to be included in the functionality of the new component type;

means for determining the number of graphical connections that provide an input to the selected objects, wherein inputs to named variable objects which have the same name are represented by a single graphical input;

means for determining the number of graphical connections that provide an output to the selected objects, wherein outputs to named variable objects which have the same name are represented by a single graphical output;

means for determining an interface definition to the new component type, which defines how an instance (a new component object) of the new component type interacts with other objects in the graphically defined formula;

means for determining a graphical definition of the new component type, which includes a representation of the new component object having the determined number of inputs and the determined number of outputs; and means for determining a logical definition of the new component type, which includes the logical definition of the selected components.

According to a fifteenth aspect of the present invention there is provided a system of defining a new component type of a graphically defined formula, comprising at least:

means for providing a graphically defined formula including one or more objects that graphically define the formula, the graphically defined formula having a logical definition and a graphical definition, wherein the graphically defined formula includes a plurality of variable name objects that represent a logical connection to another object and at least two of the variable objects have the same name;

means for selecting one or more of the objects to be included in the functionality of the new component type;

means for determining the number of graphical connections that provide an input to the selected objects, wherein inputs to named variable objects which have the same name are represented by a single graphical input;

means for determining the number of graphical connections that provide an output to the selected objects, wherein outputs to named variable objects which have the same name are represented by a single graphical output;

means for determining an interface definition to the new component type, which defines how an instance (a new component object) of the new component type interacts with other objects in the graphically defined formula;

means for determining a graphical definition of the new component type, which includes a representation of the new component object having the determined number of inputs and the determined number of outputs; and means for determining a logical definition of the new component type, which includes the logical definition of the selected components.

DESCRIPTION OF DIAGRAMS

In order to provide a better understanding, a preferred embodiment of the present invention will now be described in more detail, by way of example only, with reference to the accompanying drawings, in which.

DETAILED DESCRIPTION OF PREFERRED EMBODIMENTS

The present invention relates to the invention disclosed in the specification accompanying PCT/AU01/01053, the contents of which are incorporated herein by reference.

It is noted that the present application uses slightly different terminology to the International Application. The following are equivalent terms:

operator object in the International application is equivalent to a component in the present application;

variable object is equivalent to named value;

relationship is equivalent to connection; and result is equivalent to output.

Throughout the specification, the phrase "graphically defining a formula" is intended to mean a formula represented graphically where one or more input variables are manipulated by one or more components to produce one or more result variables. The formula can be representative of a model, rather than a strictly mathematical formula per se. Accordingly, the term "formula" is intended to include the concept of a model.

Figure 1:
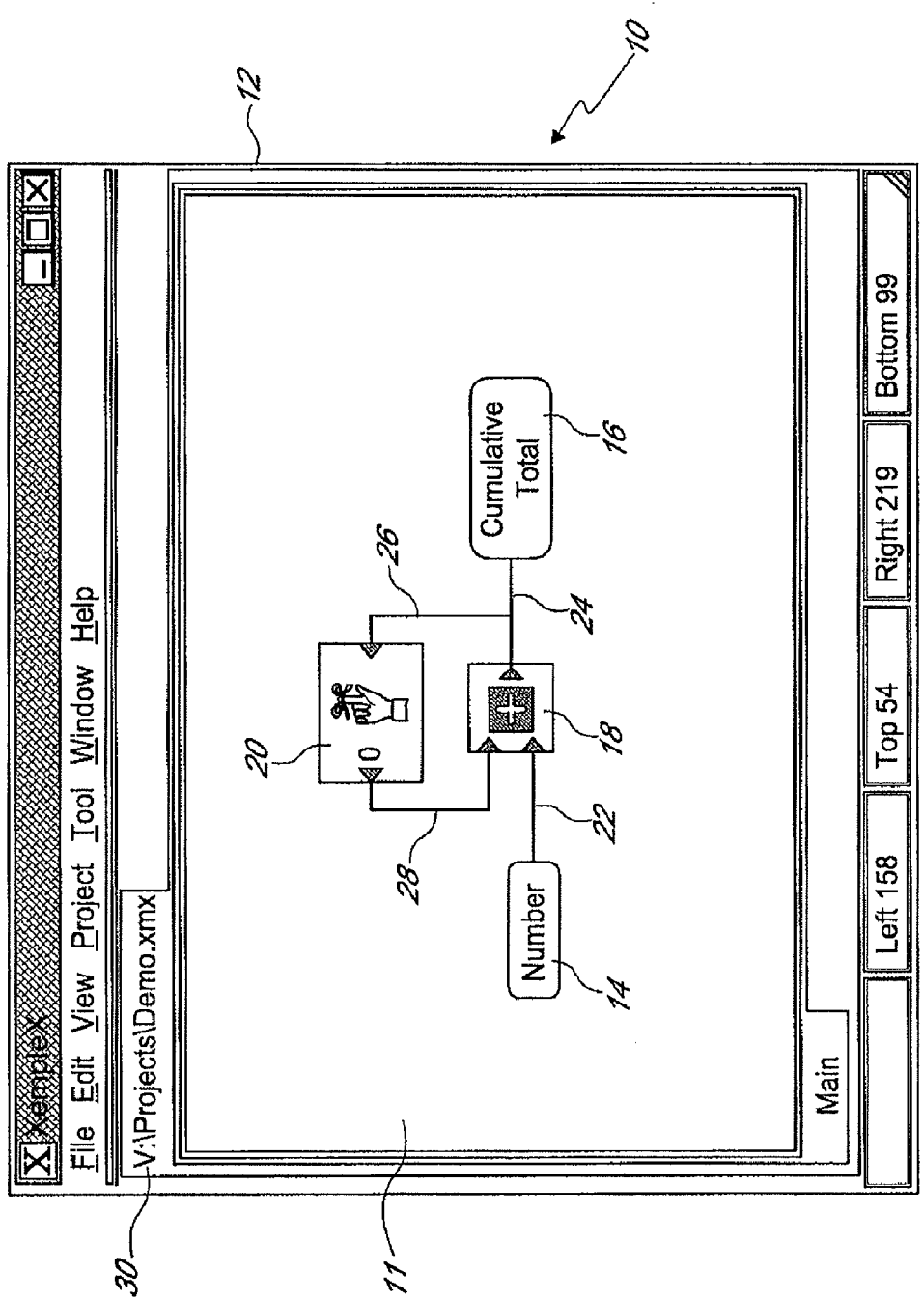
FIG. 1 is a screen capture of a computer program for graphically defining a formula, with a demonstration formula shown inside a window of the computer program.

Referring to FIG. 1, a screen shot of the computer program window 12 graphically defining a formula is shown. Inside the computer program window is a main page 11 in which is defined an example of graphically defined formula 10. The main page 11 has a tab 30 indicating the name of the page. The tab 30 may be used to select the page displayed in the window 12.

Formula 10 is representative of an accumulator, that is, as numbers are provided to the accumulator each number is added to the previous total to provide an accumulated total.

The formula 10 includes a number of objects that are related in a particular manner to represent the formula. The objects include a notional model input 14 termed "Number" and a notional model output 16 termed "Cumulative Total". Between the input 14 and the output 16 are component and connection objects. A connection 22 links the input "Number" 14 to an input of an addition component 18. An output of the addition component 18 is connected by connection 26 to a memory component 20, which remembers the previous value provided to its input. The output from the memory component 20 is linked by the connection 28 to the other input of the addition component 18. The output of the additional component 18 is also linked by connection 24 to the output "Cumulative Total" 16. This graphical definition provides a model of an iterative process of accumulating numbers. It can be represented mathematically as $CT_n = CT_{n-1} + N$, where $CT_n$ is the current cumulative total, $CT_{n-1}$ is the previous cumulative total and N is the current number.

The computer program provides a graphical definition of the formula and a logical definition of the formula. The graphical definition indicates what is graphically displayed according to the formula defined by the user. The logical definition defines the logical operation behind the formula defined by the user. An example of the definitions for the formula shown in FIG. 1 is listed in Appendix 1. The definitions are in a form of extensible mark-up language (XML).

Referring to the listing provided in Appendix 1, the definition of the formula is divided into a graphical definition 100 and a logical definition 110. The graphical definition 100 includes definitions of the addition component 18 at 102, the memory component 20 at 104, the named values "Number" 14 and "Cumulative Total" 16 at 106, and the connections 22, 24, 26 and 28 at 108. The graphical definition provides information on how to display the formula in the window 12.

The logical definition 110 includes definitions of the addition component 18 at 112, definition of the memory component 20 at 114 and the connections therebetween at 116. The logical definition describes what the components do and how data is transferred therebetween.

Objects are often attributed with properties so that checking can be performed as to whether components are allowed to be connected to one another. Furthermore, inheritance of properties may also be provided.

Figure 2:
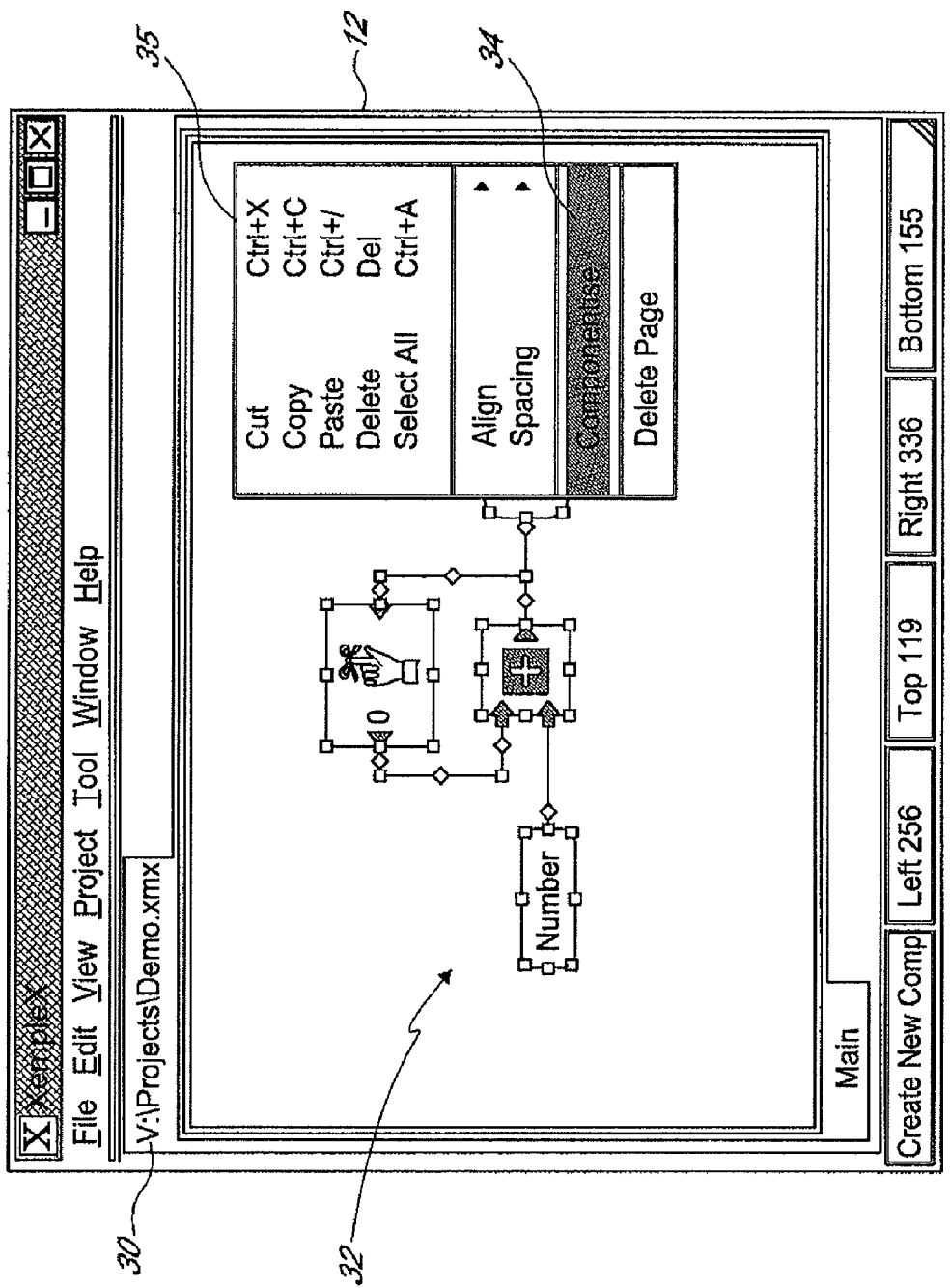
FIG. 2 is a screen capture of selected components of the formula shown in FIG. 1 about to be componentised using a componentised function shown on a menu.

Referring to FIG. 2, a user desiring to group objects including components, connections and named value into a single component, selects those components as shown by selected components 32. In this case, all the components shown are selected. Depending on what objects the user wishes to componentise, only some of those components may be selected, for example the named values "Number" 14 and "Cumulative Total" 16 need not be selected.

The user then selects a componentise function 34 from an options menu 35. The software then componentises the selected objects as follows:

1. Determine the identification of the selected components and named values to be included in the new component. If no components are selected, then componentisation cannot occur. If the connector (input or output) of any selected component is connected to a named value that has not been selected, then the named value instance may also be considered part of the selected items, depending on implementation of the software and/or as a user selected option.

2. The user is then asked for the component details, such as the new component's name. In the example shown in FIG. 3, the component is named FUNC (short for function).

3. Depending on the configuration the new component may be unique or it may become a new type of component that can be used multiple times with each instance of the type being the same as other instances of the same component type. In this example if a component is to be unique, it becomes a single instance only of a unique component type. The input and output connectors and their properties of the new component type are determined. This is conducted by:

3.1 Each selected named value that has an interface role of "input" to the model is included as an input to the new component. In the case of multiple instances of the same named value being an input to the selected components, only one input to the new component is provided for that named value. The attributes of each named value or input connector become the attributes of the corresponding input of the new component. The attributes will typically include the name of the named value, data type, etc.

3.2 Each selected named value for which the data source is not included in the selected objects is included as an input to the new component. Multiple instances of the same named value are merged into a single input. The attributes of this input are set to the attributes of the named value.

3.3 Each input connector on each of the selected components that does not have its source selected, or is not connected, is included as an input to the new component. The values of the attributes of this input are set to the default attributes of the input connector on the selected component.

3.4 Each selected named value with one or more destination objects not included in the selected objects is included as an output of the new component. Multiple instances of the same named value are only provided as a single output. The attributes of the output are set to the attributes of the named value.

3.5 Each selected named valued that has an interface role of "output of the model" is included as an output of the new component. Where there are multiple instances of the same named value being an output, only one output of the new component is provide for that named value. The attributes of the output are set to the same as those of the named value.

3.6 Each output connector on each of the selected components that do not have a destination selected or is not connected, is included as an output of the new component. The attributes of the output are set to the default attributes of the output connector on the selected component.

3.7 For each of the input and output connectors identified the user can select attributes for each of the inputs and outputs. If an attribute selected by the user is not valid then the user will be informed that this will cause a problem with the current model and they must choose a different option. If the data type selected is not compatible with the connection, the user will be informed that the data type is invalid and they will be given the option to select another data type. The data type may be automatically taken from the attributes of the connector.

4. For the part of the model being componentised:

4.1 A new sub-component type of the model is created.

4.2 The objects being componentised may include components represented on more than one page. Each page in the objects being componentised is represented in the new component type. For each page within the selected components:

4.2.1 A new page 41 is created in the sub-component type.

4.2.2 The name of the new page is set to the name of the original page.

4.2.3 The selected component instances on the original page are moved to the new page.

4.2.4 The selected named values and the instances of the original page are created in the new sub-component type (if they have not already been created) and instances placed on the new page. For each of the named values, if the named value is not specified as having an interface role or is not otherwise an interface named value, then the named value is removed from the original page.

4.2.5 The connections between the selected component and named value instances on the original page are moved to the new page.

4.2.6 Where one of the connectors now on the new page results in an input or output connector on the new sub-component type, a named value representing the input or output is created within the sub-component type (if it has not already been created) and is placed onto the new page and connected to the connector.

4.3 An instance of the new sub-component type is placed on the active page of the original model and for each connector of the new sub-component instance, the connection between the component or named value to which it was previously connected is added. In placing an instance (new component object) of the new component type onto the active page of the model, if the source of an input connector or destination of an output connector is on another page within the current model then a new named value is created in the current model with a unique name, and an instance of the named valued is added to the other page and connected to the source or destination connector. Another instance of this named valued is added to the active page to connect it to the input or output connector of the new sub-component instance. If there are multiple instances of named values with an interface role that were not deleted but their connections to the new component were merged into a single input or output, then one of the multiple instances is connected to the respective input/output of the new component.

5. For each of the input and output connectors identified: if the connector was defined by a named value then the named value of the component's model is updated with values provided by the user. This may also happen on interface names (attributes); and if the connector is not defined by a named value, then a new named value is added to component's model and the attributes are sent by the user. This may be done automatically without user intervention. The named values are connected to the connectors from which they are derived. The name can be displayed as a label and/or the name of the connector can be displayed as a fly-by hint which appears when the mouse pointer hovers over the connector object.

The user may be provided with the ability to undo the componentisation.

Figure 3:
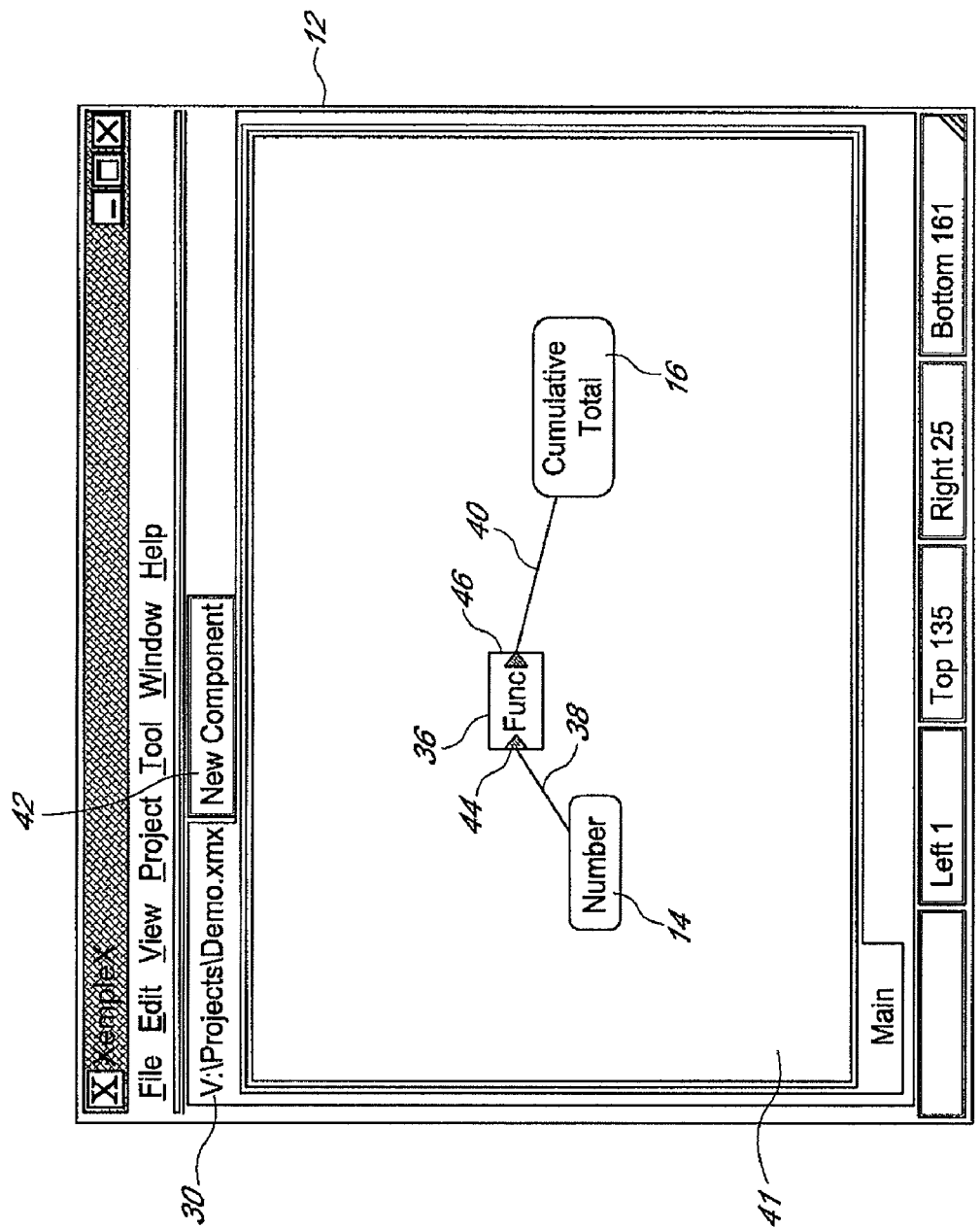
FIG. 3 shows a formula after componentising the selected components in FIG. 2.

Referring to FIG. 3, the result of this process is displayed on the main page 30 with the "Func" component 36 replacing selected components and connections. In particular the named value "Number" 14 is connected by connector 38 to the input 44 of function 36. The output 46 of the function 36 is connected by connector 40 to the named value "Cumulative Total" 16. A new component tab 42 is provided to allow the user to switch to the page 41 showing the componentised objects.

The new component will have properties according to the properties of the objects therein. Some of the new component's properties may be changed or further properties added. Examples of additional properties include icon displayed, component name, description, certification, etc.

Figure 4:
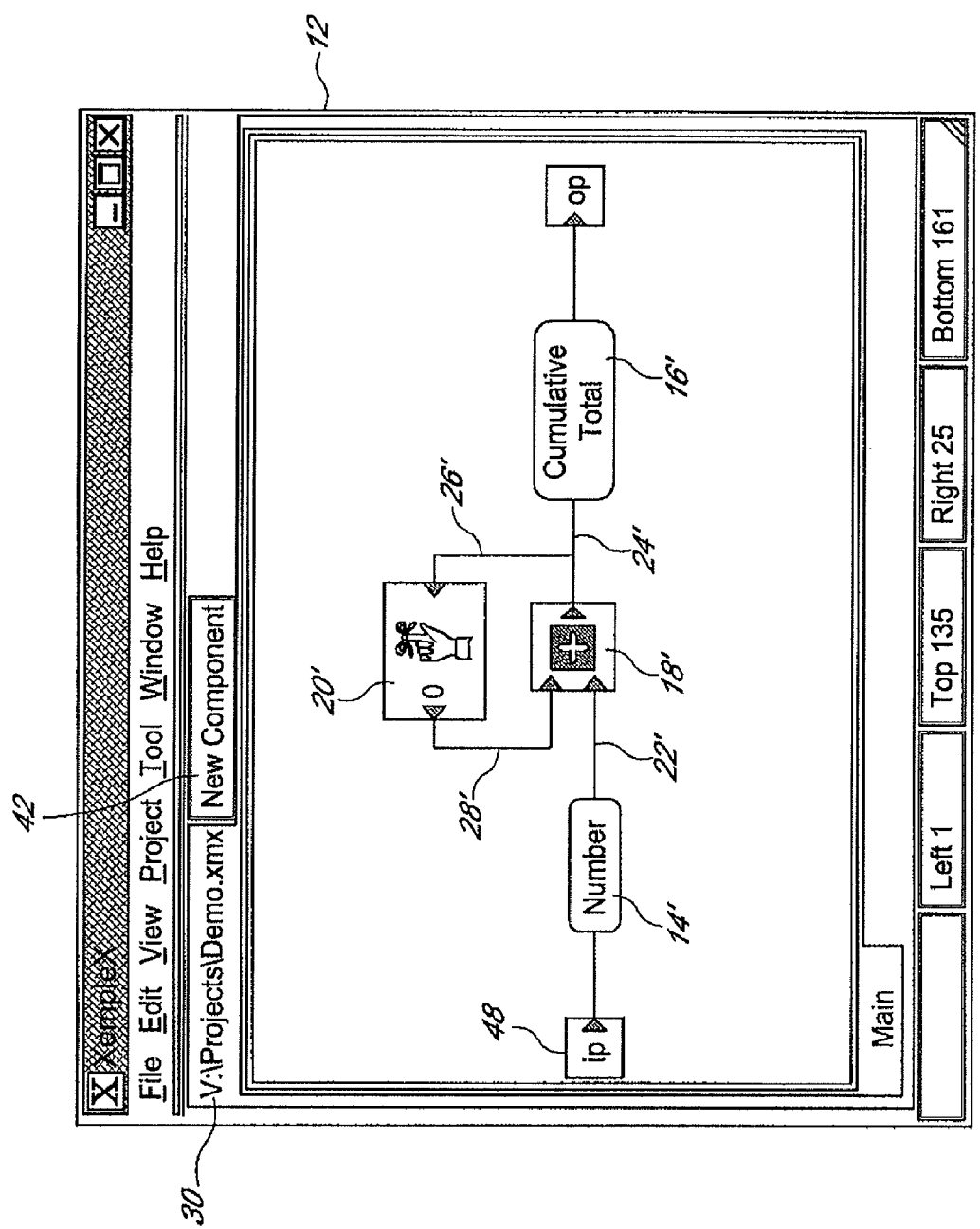
FIG. 4 shows the componentised components in a new component window.

Referring to FIG. 4 the componentised objects are shown on the new component page 41. Input 48 corresponds with input 44 of the function 36 and output 50 corresponds with output 46 of the function 36. The other objects in the new component are the same as those selected in FIG. 2. That is, input 48 is connected to the named value "Number" 14' which is connected by connector 22' to one input of the addition component 18'. The output of the addition component 18' is connected by connector 26' to the input of the memory component 20'. The output of the memory component 20' is provided by connector 28' to the other input of the addition component 18'. The output of the add component 18' is also connected by connector 24' to the named value "Cumulative Total" 16', which is in turn connected to the output 50. The new component page 41 may also be provided by double clicking on the new component FUNC to "drill down" to the inner workings of that component.

Multiple levels of componentisation can be provided with each component enabling drilling down to show its inner workings. The exceptions to this are intrinsic components which are bottom level components and cannot be further expanded. Some components may also require certain privileges to be expanded to see their inner workings.

The new component type may be made available for reuse either elsewhere in the same model or in other models. A button or menu option may be made available to allow selection of the new component type. Where the component type is made available in other models the definition may be moved outside of the model and replaced with a link to the new location of the definition.

Referring to Appendix 2 the definition of the formula in Appendix 1 is updated to take into account the componentisation process. The definition includes an interface section 250 which is a sub-section of the graphical definition. In this case, the graphical definition includes the interface 250, and a component model definition 270 (which is the definition of the new page) and main graphical model definition 200 which is the graphical definition of the main page. The logical definition includes definition sections 230 and 210.

The interface section 250 of the graphical definition includes information displayed on the interface, that is, the window for the user includes the information about the new component including its image bit map, number of inputs and number of outputs determined by the process described above. The definition section 270 includes a definition of how the components are displayed in the window when the new page is selected. This section of the definition includes properties of the addition (add) component 18' at 272, the memory component 20' at 274, the "Cumulative Total" named value 16' at 280, the "Number" named valued 14' at 282, the named connections at 276 and visible (unnamed connections) at 278. In the graphical definition of the main page at 200, the definition includes the new FUNC component 36 at 208, the named connections 14 and 16 at 204 and the unnamed visible connections 38 and 40 at 206.

The logical definition includes a section moved to the hierarchically different (lower) level at 230 which includes logical definitions of the new component, which include the add function at 232, the memory function at 234, the inputs and outputs at 236 and the connections 238 which relate to the new component page. The logical definition also includes the upper hierarchical level at 210, which includes the new component 215 which operates as a reference to the lower level definition at 230, the input at 214 and the output at 216. By moving the logical definition of the componentised objects to a different level, the logical definition remains logically/mathematically/functionally equivalent to the former logical definition. When the logical definition is processed to calculate the result based on an input the logical definition is processed in the same logical manner because the reference to the new component causes the flow of calculation to move lower in the hierarchy to process the component and then return to the higher level in the hierarchy.

The new component type can be graphically redefined by graphically modifying the inner-graphical definition, which in turn results in corresponding changes to the logical definition. Each instance of the component may be modified to reflect the changes made and the redefinition of the component type. Alternatively additional information may be stored in the component type including version information. Version information may be recorded along with each version of the definition so that the definition corresponding to the version of the component type may be selected and used.

Further information stored in a component type definition may include a dependency map. A dependency map will include information on the dependency of each of the input and output connections to the new component type. The dependency map may be used to check for circular references. In particular the dependency map may be passed up to higher level components for circular reference checking.

Further information stored in the component type may include reference information on other components used within the component type. A complete list of components used and each of the components and sub-components is stored and may also be passed up to higher levels of the component hierarchy. Reference information may be used to check for recursion within component definitions to prevent recursive placement of components.

By storing additional information within the component type any level of the hierarchy of a component in a model may be checked for, for example, recursion and circular referencing. This additional information may be stored as attributes to the component type.

Figure 5:
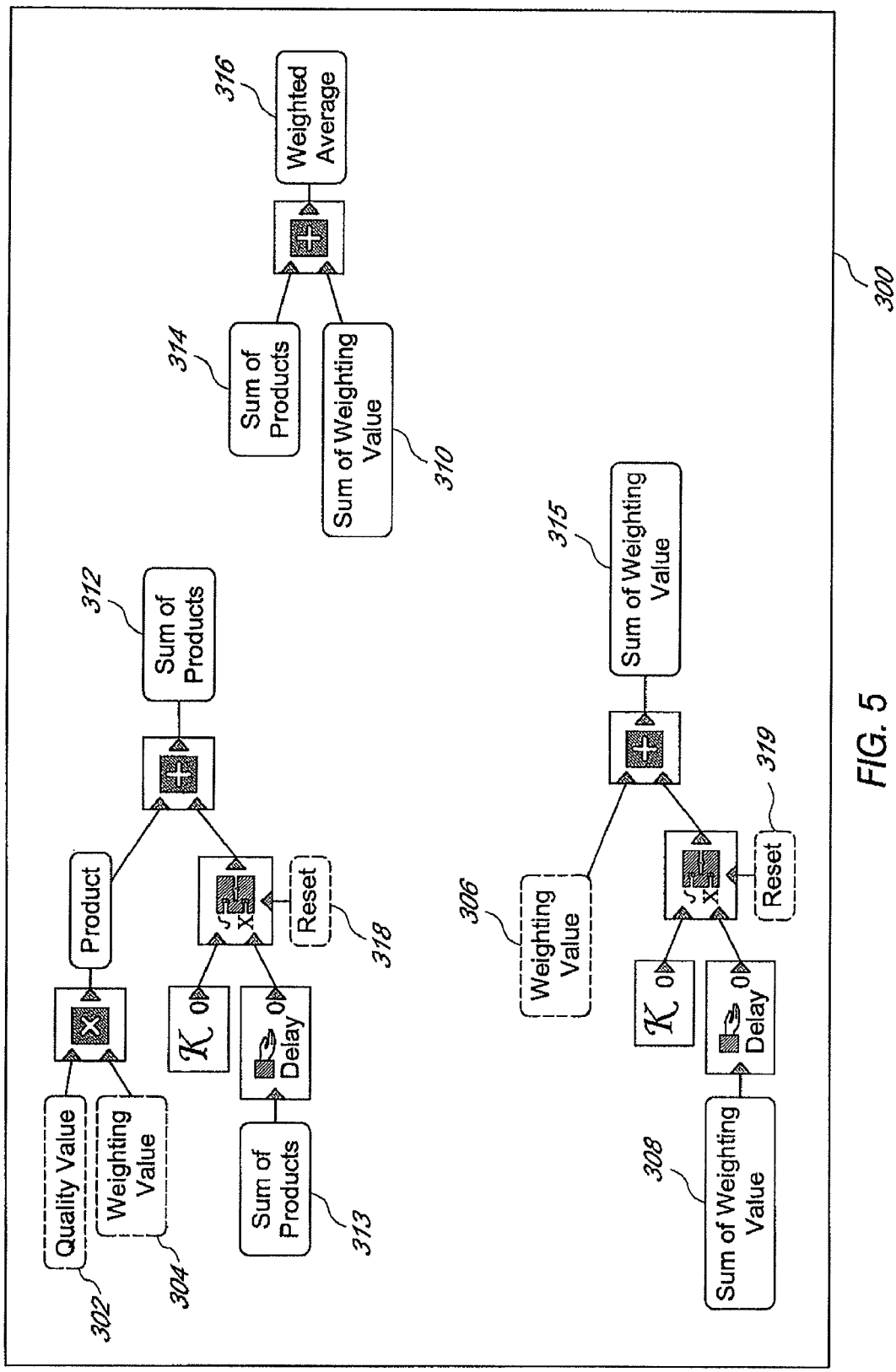
FIG. 5 shows a part of a screen capture from a computer program for graphically defining a formula, with a demonstration formula shown inside a window of the computer program, the demonstration formula is shown prior to componentisation according to the present invention.

Referring to FIG. 5, a screen shot of a computer program window 300 displaying a graphically defined formula is shown. Inside the window 300 is a formula for calculating a weighted average from a sequence of quality values and weighting values. The quality values are input through the named value 302 called "Quality Value" and the weighting values are input through the named value 304 called "Weighting Value". The named values 304 and 306 are, at this stage unconnected as the source is not yet defined. If either 304 or 306 were connected to a source, or if another named value with the same name existed elsewhere in the model and it was connected to a source, then 304 and 306 would be logically connected to that source. In a logical sense they are not connected to one another but rather share a common source—either defined or not yet defined. Both named value components have the same properties.

As each new quality value is provided to the named value 302 and each new weighting value is provided to named value 304 the product of the quality value and weighting value is calculated and added to one of: the last sum of products; or (at reset) a constant K, to produce a new sum of products at named value 312. A logical connect exists between named value 312 and named values 313 and 314 respectively because they have the same named value name.

The same weighting value is added to one of: the last sum of weighting values; or (at reset) a constant K, to produce the output sum of weighting value at the named value 315. This is transferred to named value 308 and named value 310 because these named values are all of the same name.

Sum of products at named value 314 is divided by sum of weighted value 310 to produce the weighted average at 316.

Figure 6:
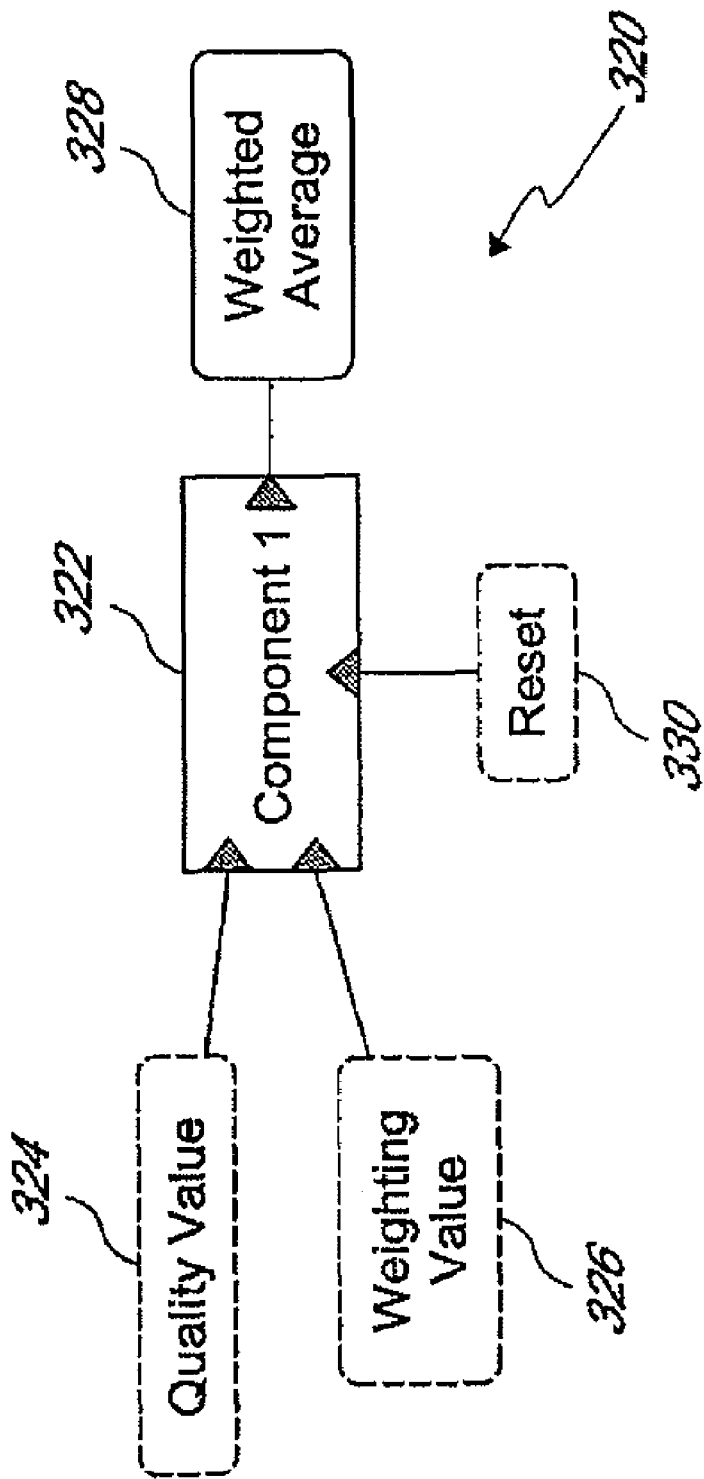
FIG. 6 shows part a screen capture of a computer program for graphically defining a formula, with the formula of FIG. 5 after componentisation.

All of the components are shown inside window 300 are selected for componentisation, and then componentised. The result 320 shown in FIG. 6.

The named values, such as sum of products 312, that do not have a source or an output outside of the selected component are not provided as inputs or outputs (as appropriate) to the new component. Multiple instances of Weighting Value named values 304 and 306 have been replaced with a singe instance 326 after componentisation. The inputs from instances 304 and 306 have been replaced with a single instance of an input to the component 322. The same applies to resets 318 and 319 which have a single instance of reset 330 and a single input.

The named value quality value 324 corresponds to the named value 302 prior to componentisation and the output named value weighted average 328 corresponds to the output 316 prior to componentisation.

Figure 7:
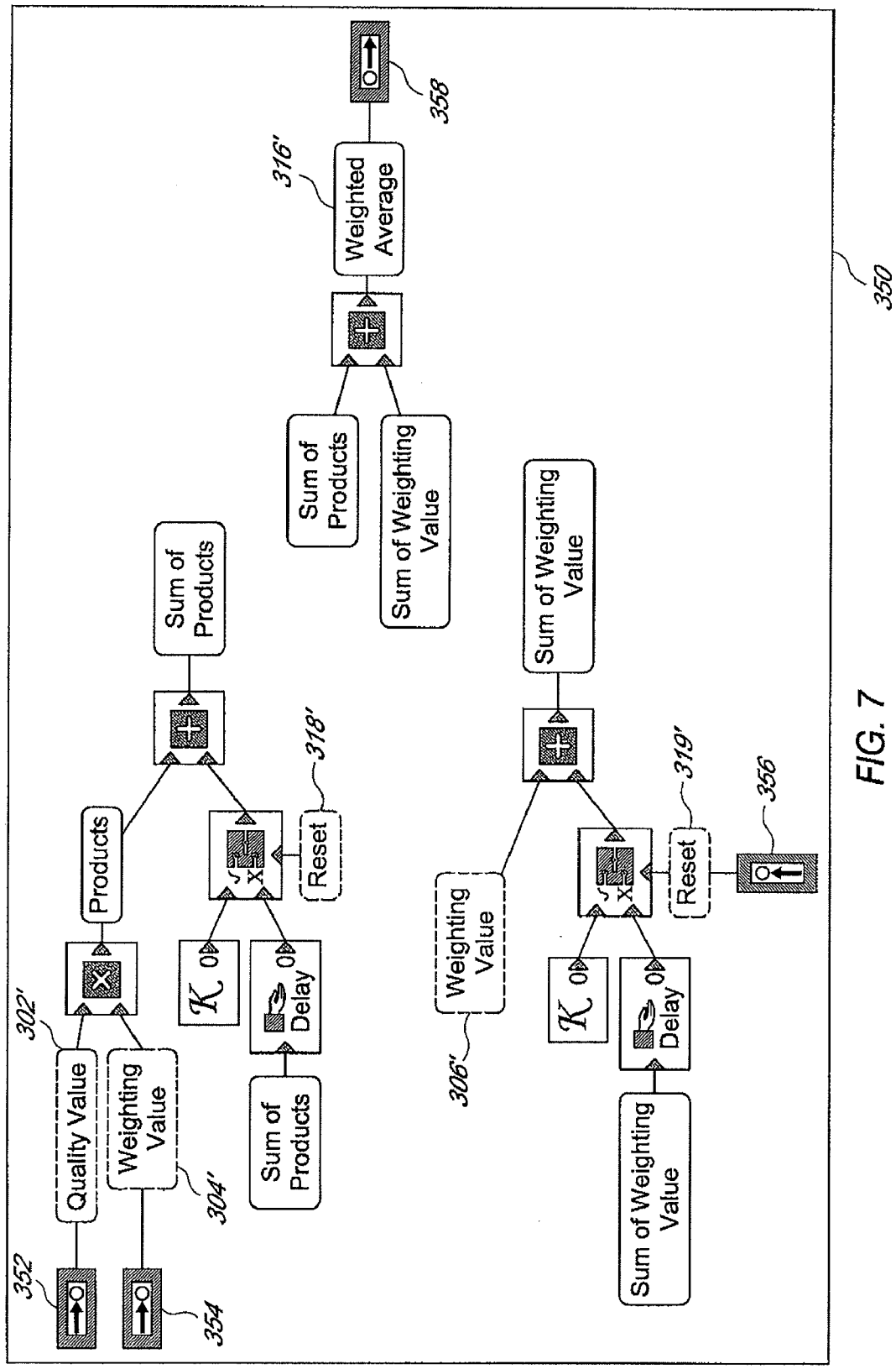
FIG. 7 shows the screen capture of a computer program of a computer program for graphically defining a formula, with the graphical formula defined when component 1 of FIG. 6 is expanded to show its inner workings.

Referring to FIG. 7, component 322 is expanded to see its inner workings as shown in window 350. Icons 352 and 354 and 356 represent inputs into this component from another hierarchal level (that shown in FIG. 6). Output icon 358 represents an output to the other hierarchal level of the graphically defined formula. It can be seen that the input 352 being the first input of the component 322, receives its data from 324 which in turn provides it to named value 302'. Likewise the second input to the component 322 receives data from the weighting value named value 326. From this input icon 354 is connected to weighting value 304'. Due to weighting value 304' and weighting named value 306' being the same named value the data is then logically transferred between these two named values. Likewise input from reset 330 is provided to input icon 356, which in turn is provided to both 319' and 318'. Furthermore output from weighted average named value 316' is provided to output icon 358 which in turn is provided to the output of the component 322, which is in turn provided to named value weighted average 328.

Modifications and variations may be made to the present invention without departing from the basic inventive concept.

Modifications may include always copying named values crossing the border of a component so that they appear both external and internal to the component, only internal to the component or only external to the component. The form of graphical and/or logical definition may be different than that provided in the examples in Appendix 1 and 2.

Such modifications and variations are intended to fall within the scope of the present invention, the nature of which is to be determined from the foregoing description.

---

APPENDIX 1

```
<?xml version = "1.0"?>
<Xemplex>
    <Model>
        <Page Name = "Main">
            <Component Name = "Add" GUID = "{63CDD760-8033-4520-
9789-B60D1DAA11A7} Left = "171" Top = "119">
```

APPENDIX 1

```
              <Property Name = "Application" ReadOnly = "True"
       Type = "Text" Value = "Xemplex"/>
              <Property Hidden = "True" Name = "Description"
       ReadOnly = "True" Type = "Text" Value = "Native Xemplex
       Component" />
102           <Property Hidden = "True" Name = "Operation"
       ReadOnly = "True" Type = "Text" Value = "Add"/>
              <Connector Type = "Input" Name = "Value" UID =
       "1" CTID = "I0-0" Edge = "Left"/>
              <Connector Type = "Input" Name = "Connector #1"
       UID = "2" CTID = "I0-1" Edge = "Left"/>
              <Connector Type = "Output" Name = "Sum" UID = "3"
       CTID = "O0" Edge = "Right"/>
           </Component>
           <Component Name = "Memory" GUID = "(A515561E-95B2-
       41C0-809C-22BB37573FA5)" Left = "158" Top = "54">
              <Property Name = "Application" ReadOnly = "True"
       Type = "Text" Value = "Xemplex"/>
              <Property Hidden = "True" Name = "Description"
       ReadOnly = "True" Type = "Text" Value = "Native Xemplex
       Component"/>
              <Property Hidden = "True" Name = "Operation"
104    ReadOnly = "True" Type = "Text" Value = "Memory"/>
              <Connector Type = "Output" Name = "Read" UID =
       "4" CTID = "O0" Edge = "Left">
                 <Property Compile = "True" Name = "Initial"
       Type = "Number" Value = "0"/>
                 <Property Hidden = "True" Name = "Show Value" ReadOnly
       = "True" Type = "Text" Value = "Initial"/>
              </Connector>
              <Connector Type = "Input" Name = "Write" UID =
       "5" CTID = "I0" Edge = "Right"/>
           </Component>
           <NamedConnection Name = "Number" UID = "6" Left =
106    "94" Top = "147"/>
           <NamedConnection Name = "Cumulative Total" UID = "7"
       Left = "296" Top = "137"/>
           <VisibleConnection EndpointA = "3" EndpointB = "5">
              <Vertex Left = "210" Top = "137"/>
              <Vertex Left = "230" Top = "137"/>
              <Vertex Left = "230" Top = "76"/>
           </VisibleConnection>
           <VisibleConnection EndpointA = "4" EndpointB = "1">
108           <Vertex Left = "157" Top = "76"/>
              <Vertex Left = "146" Top = "76"/>
              <Vertex Left = "146" Top = "128"/>
           </VisibleConnection>
           <VisibleConnection EndpointA = "3"
           EndpointB = "7"/>
           <visibleConnection EndpointA = "2" EndpointB = "6"/>
        </Page>
       </Model>
110    <Executable>
           <Component Name = "Add" UID = "8" GUID = "(63CDD760-
       8033-4520-9789-B60D1DAA11A7)">
              <Input Name = "Value" Type = "Number" CTID = "I0-
112    0"/>
              <Input Name = "Connector #1" Type = "Number" CTID =
       "I0-1"/>
              <Output Name = "Sum" Type = "Number" CTID = "O0"/>
           </Component>
           <Component Name = "Memory" UID = "9" GUID = "(A515561E
       95B2-41C0-809C-22BB37573FA5)">
114           <Input Name = "Write" Type = "Number" CTID = "I0"/>
              <Output Name = "Read" Type = "Number" CTID = "O0"
       Initial = "0"/>
           </Component>
           <Connection From = "8" OutputCTID = "O0" Output = "Sum"
116    To = "9" InputCTID = "I0" Input = "Write"/>
           <Connection From = "9" OutputCTID = "O0" Output =
       "Read" To = "8" InputCTID = "I0-0" Input = "Value"/>
        </Executable>
       </Xemplex>
        <?xml version = "1.0"?>
        <Xemplex>
           <Type Author = "russell" GUID = "(3F4C7B4D-AA9F45E0
```

-continued

APPENDIX 1

```
                  9FAA-5D332F6FD2F2)" Type = "Generic" Name = "New Component"
                  Package = "DemoAfter.xmx">
~~~                    <Interface>
250   /252               <Property Name = "Application" Value = "Internal"
   \              Type = "Text" Compile = "True"/>
    /254                 <Property Name = "Operation" Value = "New
   \              Component" Type = "Text" Compile = "True" Hidden >> "True"/>
   /                     <Icon>
                           <Image Bitmap =
                  "NDI0RDE2MDUwDAwMDAWMDAwMDAzNjAwMDAwMDI4MDAwMDAwMTgwMDAwMDA
                  wRDAwMDAwMDAxMDAyMDAwMDAwMDAwMDBFMDA0MDAwMDAwMDAwMDAwMDA
       256
                  <data omitted for space>
                  kZGRkZGMDBGRkZGRVYwMEZGRkZGRjAwRkZGRkZGMDBGRktGBkYwMEZGPkZGR.
                  jAwRkZGRkZGMDEGRkZGRkYwMEZGRkZGRjAw"/>
   \                     </Icon>
   /                     <Inputs>
       258                 <Input CTID = "I0" Name = "Number" Type =
                  "Number" Edge = "Left"/>
   \                     </Inputs>
   /                     <Outputs>
       260                 <Output CTID = "O0" Name = "Cumulative Total"
                  Type = "Number" Edge = "Right"/>
   \                     </Outputs>
                       </Interface>
~~~                    <Model>
270                      <Page Name = "NewPage">
   /                       <Component Name = "Add" GUID = "(63CDD760-8033-
                  4520-9789-B60D1DAA11A7)" Left = "171" Top = "119.">
                             <Property Name = "Application" ReadOnly =
                  "True" Type = "Text", Value = "Xemplex"/>
                             <Property Hidden = "True" Name =
                  "Description" ReadOnly = "True" Type = "Text" Value =
                  "Native Xemplex Component"/>
       272                   <Property Hidden = "True" Name = "Operation"
                  ReadOnly = "True" Type = "Text" Value = "Add"/>
                             <Connector Type = "Input" Name "Value" UID =
                  "14" CTID = "I0-0" Edge = "Left"/>
                             <Connector Type = "Input" Name = "Connector
                  #1" UID = "15" CTID = "I0-1" Edge = "Left"/>
                             <Connector Type = "Output" Name = "Sum" UID =
                  "16" CTID = "O0" Edge = "Right"/>
   \                       </Component>
   /                       <Component Name = "Memory" QUID = "{A515561E
                  95B2-41C0-809C-22BB37573FA5)" Left = "158" Top = "54">
                             <Property Name = "Application" ReadOnly =
                  "True" Type = "Text" Value = "Xemplex"/>
                             <Property Hidden = "True" Name =
                  "Description" ReadOnly = "True" Type = "Text" Value =
       274        "Native Xemplex Component"/>
                             <Property Hidden = "True" Name "Operation"
                  ReadOnly = "True" Type = "Text" Value = "Memory"/>
                             <Connector Type = "Output" Name = "Read" UID
                  = "17" CTID = "O0" Edge =, "Left">
                             <Property Compile = "True" Name =
                  "Initial" Type = "Number" Value    "0"/>
                             <Property Hidden = "True" Name = "Show
                  Value" ReadOnly = "True" Type = "Text" Value "Initial"/>
                             </Connector>
                             <Connector Type = "Input" Name = "Write" UID
                  = "18" CTID = "I0" Edge = "Right"/>
   \                       </Component>
   /                       <Component Name = "Cumulative Total" GUID =
                  "Output" Left = "376" Top = "125">
       280                   <Property Name = "Connector" Value "O0"
                  Type = "Text" Editable = "False" Compile = "True"/>
                             <Connector Type "Input" Name = "Cumulative
                  Total" UID = "19" CTID = "O0" Edge = "Left"/>
   \                       </Component>
   /                       <Component Name = "Number" GUID = "Input" Left =
                  "1" Top = "135">
                             <Property Name = "Connector" Value = "I0"
       282        Type = "Text" Editable = "False" Compile = "True"/>
                             <Connector Type = "Output" Name = "Number"
                  UID = "20" CTID = "I0-1" Edge = "Right"/>
   \                       </Component>
   /                       <NamedConnection Name = "Number" UID = "21" Left
```

APPENDIX 1

```
276             = "94" Top = "147"/>
                    <NamedConnection Name = "Cumulative Total" UID =
                "22" Left = "296" Top = "137"/>
                    <VisibleConnection EndpointA = "16" EndpointB =
                "18">
                        <Vertex Left = "210" Top = "137"/>
                        <Vertex Left = "230" Top = "137"/>
                        <Vertex Left = "230" Top = "76"/>
                    </VisibleConnection>
                    <VisibleConnection EndpointA = "17" EndpointB =
                "14">
278                     <Vertex Left = "157" Top = "76"/>
                        <Vertex Left = "146" Top = "76"/>
                        <Vertex Left = "146" Top = "128"/>
                    </VisibleConnection>
                    <VisibleConnection EndpointA = "16" EndpointB =
                "22"/>
                    <VisibleConnection EndpointA = "15" EndpointB =
                "21"/>
                    <VisibleConnection EndpointA = "19" EndpointB =
                "22"/>
                    <VisibleConnection EndpointA = "20" EndpointB =
                "21"/>
                </Page>
            </Model>
            <Executable>
230
                    <Component Name = "Add" UID = "23" GUID =
                "{63CDD760-8033-4520-9789-860D1DAA11A7}">
                        <Input Name = "Value" Type = "Number" CTID =
232             "I0-0"/>
                        <Input Name = "Connector #1" Type = "Number"
                CTID = "I0-1"/>
                        <Output Name = "Sum" Type = "Number" CTID =
                "O0"/>
                    </Component>
                    <Component Name = "Memory" UID = "24" GUID =
                "{A515561E-95B2-41C0-809C-22BB37573FA5)">
                        <Input Name = "Write" Type = "Number" CTID =
234             "I0"/>
                        <Output Name = "Read" Type = "Number" CTID =
                "O0" Initial "0"/>
                    </Component>
                    <Parameter Name = "Cumulative Total" UID = "25"
                Connector = "O0">
                        <Input Name = "Cumulative Total" Type = "Number"
                CTID = "O0/>
236                 </Parameter>
                    <Parameter Name = "Number" UID = "26" Connector =
                "I0">
                        <Output Name = "Number" Type = "Number" CTID =
                "I0-1"/>
                    </Parameter>
                    <Connection From = "23" OutputCTID = "O0" Output =
                "Sum" To = "24" InputCTID = "I0" Input = "Write"/>
                    <Connection From = "24" OutputCTID "O0" Output =
                "Read" To = "23" InputCTID = "I0-0" Input = "Value"/>
238                 <Connection From = "26" OutputCTID = "I0-1" Output
                = "Number" To "23" InputCTID = "I0-1" Input = "Connector
                #1"/>
                    <Connection From = "23" OutputCTID = "O0" Output =
                "Sum" To = "25" InputCTID = "O0" Input = "Cumulative
                Total"/>
                </Executable>
            </Type>
            <Model>
200             <Page Name = "Main">
                    <Component Name = "New Component2" GUID =
                "(3F4C7B4D-AA9F-45E0-9FAA-5D332F6FD2F2)" Left = "150" Top =
                "95">
                        <Property Name = "Application" Value =
                "Internal" Type = "Text" Compile = "True"/>
208                     <Property Name = "Operation" Value = "New
                Component" Type = "Text" Compile = "True" Hidden = "True"/>
                        <Connector Type = "Input" Name = "Number" UID =
```

APPENDIX 1 -continued

```
                "1" CTID = "10-1" Edge = "Left"/>
                    <Connector Type "Output" Name = "Cumulative
            Total" UID = "2" CTID = "00" Edge = "Right"/>
   \              </Component>
    /             <NamedConnection Name = "Number" UID = "3" Left =
  204         "94" Top = "147"/>
                  <NamedConnection Name = "Cumulative Total" UID =
   \          "4" Left = "296" Top = "137"/>
  /               <VisibleConnection EndpointA = "2" EndpointB =
206           "4"/>
                  <VisibleConnection EndpointA = "1" EndpointB =
  \           "3"/>
                </Page>
~~~          </Model>
 210         <Executable>
   /            <Component Name = "New Component2" UID = "5" GUID =
   215       "{3F4C7B4D-AA9F-45E0-9FAA-5D332F6FD2F2}" Application =
   \         "Internal" Operation = "New Component">
   / 214         <Input Name = "Number" Type = "Number" CTID = "I0-
   \         1"/>
   / 216         <Output Name = "Cumulative Total" Type = "Number"
   \         CTID = "00"/>
                </Component>
~~~          </Executable>
            </Xemplex>
```

The invention claimed is:

1. A computer implemented method of graphically defining a formula, said method comprising:

displaying a graphically defined formula comprising one or more graphically connected graphical objects that graphically define the formula;

selecting one or more of the graphical objects to be grouped into a new component object;

determining the number of connections that provide an input to the selected objects;

determining the number of connections that provide an output from the selected objects;

determining a graphical definition of the formula, where the selected objects are replaced with a graphical representation of the new component object having a number of inputs based on the determined number of connections that provide an input and a number of outputs based on the determined number of connections that provide an output, one of more of the connections inputting to the selected objects from non-selected objects are replaced with one or more connections connecting to the input(s) of the new component object and one of more of the connections outputting from the selected objects to the non-selected objects are replaced with one or more connections connecting from the output(s) of the new component object;

determining a logical definition of the formula which non-graphically describes the functionality of the formula represented by the graphical objects in the graphically defined formula based on the graphically connected graphical objects and the selection of one or more of the graphical objects, the logical definition of the formula excluding information necessary to display the graphically defined formula, wherein the selected objects are retained in the logical definition; and determining the input/output properties of connections that connect to the selected objects, and providing each input of the new component object with the properties of the corresponding connection inputting the selected objects and providing each output of the new component object with the properties of the corresponding connection outputting from the selected objects.

2. A method according to claim 1, wherein the graphical objects are graphical representations of one or more of: components, each of which represents an operation performed on input data to produce output data; named values, each of which represents a labeled variable for holding data; or connections, each of which represents a data transfer relationship between other objects.

3. A method according to claim 2, further comprising storing a graphical definition of the replaced selected objects as a sub-set of the graphical definition of the formula.

4. A method according to claim 3, wherein the sub-set is defined so as to display the selected objects on a separate page to that of the new component.

5. A method according to claim 3, wherein the logical definition of the formula comprises a plurality of hierarchical levels, such that the description of the functionality represented by the selected objects is placed in a different level in the hierarchy to the description of the functionality represented by the non-selected objects.

6. A method according to claim 1, wherein the logical definition includes linking the functionality of the selected objects to the functionality of a different hierarchical levels of the logical definition such that the logical definition is functionally equivalent to a previous logical definition.

7. A method according to claim 1, wherein the new component object is re-useable elsewhere in the formula by making a graphical representation of the new component object available for use elsewhere in the formula and by making the functionality represented by the selected objects available for use elsewhere in the formula.

8. A method according to claim 1, wherein the new component object is useable in another graphically defined formula by making a graphical representation of the new component object available for use in the other graphically defined formula and by making the functionality represented by the selected objects available for use in the other graphically defined formula.

9. A method according to claim 5, wherein the new component object is arranged to operate as a new type of component, which is re-useable elsewhere in the formula or in another graphically defined formula, and wherein each use creates an instance of the component type.

10. A method according to claim 9, wherein the new component type is graphically re-defined, by graphically modifying the sub-set of the graphical definition, which in turn results in changes to its logical definition when the changes affect the functionality of the selected objects of the new component object, and wherein the changes occur at the different hierarchical level.

11. A method according to claim 10, wherein following re-definition of the component type all instances of the component are updated to reflect the change made in the re-definition.

12. A method according to claim 10, wherein version information is recorded with each change to the component type definition for allowing selection of a version of the component type definition in each instance of the component, and wherein the user can select a version of an instance of the component type.

13. A computer implemented method of graphically defining a formula comprising:
  displaying a graphically defined formula comprising a plurality of graphically connected graphical objects that graphically define the formula, the graphically defined formula having a logical definition and a graphical definition;
  selecting one or more of the graphical objects to be grouped into a new component object;
  determining the number of connections that provide an input to the selected objects;
  determining a number of new component inputs from the number of connections that provide an input to the selected objects and reducing this number by each extra input beyond the first which are connected together;
  determining the number of connections that provide an output from the selected objects;
  determining a number of new component outputs from the number of connections that provide an output from the selected objects and reducing this number by each extra output beyond the first which are connected together;
  changing the graphical definition to replace the selected objects with a graphical representation of the new component object having the determined number of new component inputs and the determined number of new component outputs, changing any connections inputting to the selected objects from non-selected objects into a respective connections connecting to the input(s) of the new component object and changing any connections outputting from the selected objects to the non-selected objects into a respective connections connecting to the output(s) of the new component object; and
  changing the logical definition to non-graphically describe the functionality of the formula represented by the graphical objects in the graphically defined formula based on the graphically connected graphical objects and the selection of one or more of the graphical object, the logical definition of the formula excluding information necessary to display the graphically defined formula, wherein the logical definition reflects connections between the new component object and the selected components.

14. A method according to claim 1, wherein the logical definition comprises the properties of each input and output of the new component object.

15. A method according to claim 1, wherein the graphical definition pre-exists and the determined graphical definition becomes a change to the pre-existing graphical definition.

16. A method according to claim 1, wherein the logical definition pre-exists and the determined logical definition becomes a change to the pre-existing logical definition.

17. A method according to claim 2, wherein when the selected objects include a component which is connected to a named value and the named value has not been selected, then the named value is included in the selected objects.

18. A method according to claim 2, wherein when a selected named value has a property of being an input of data into or an output of data from the graphically defined formula, then a non-selected instance of the named value is retained in the graphically defined formula, and a respective input or output of the new component object is connected to the non-selected instance of the named value.

19. A method according to claim 2, wherein when the selected objects include a plurality of named values which have the same name and the plurality of named values are connected to non-selected objects that provide an input or output to the selected objects, then the new component object has a single respective input or output which is connected to the non-selected objects in place of the connections from the corresponding non-selected objects to the selected named values of the same name.

20. A method according to claim 2, wherein when a selected named value has a property of having input data from an undefined the data source or a property of providing output data to an undefined data sink, then a respective input or output is provided in the new component object corresponding to the selected named value and the properties of the respective input or output are set to the properties of the selected named value.

21. A method according to claim 2, wherein when an input or output of a selected component is not connected to a data source or a data sink, respectively, then a respective input or output is provided in the new component object that corresponds with the respective input or output of the selected component and the properties of the respective input or output of the new component object are set to the default properties of the respective input or output of the selected component.

22. A method according to claim 2, wherein when there are a plurality of instances of non-selected named values of the same name that are connected to selected objects, then only one of the named valued is connected to the respective input or output of the new component object.

23. A method according to claim 2, wherein when one of the selected objects is connected to a non-selected object which is not a named value, then a named value is provided for a corresponding input or output of the new component object and the provided named value is connected to the respective input or output.

24. A method according to claim 3, wherein when a connection in the sub-set of the graphical definition is one of the connections that was replaced with an input or output to the new component object, then the connection is connected to a named value.

25. A method according to claim 1, wherein further comprising undoing the grouping of the selected components into the new component object, by replacing the new component object with the objects in the sub-set of the graphically defined formula and replacing the connections to the new component with connections to the objects in the sub-set.

26. A method according to claim 5, wherein the logical definition of the non-selected objects is connected to the selected objects via hierarchy connections corresponding to the inputs or outputs of the new component object.

27. A method according to claim 26, wherein the selected named values are of the same name and they are connected to non-selected objects, then the selected named values are described as transferring data to or from, respectively, the non-selected objects through a single transfer variable between hierarchy levels in the logical definition.

28. A method according to claim 1, wherein the logical definition comprises a map of dependencies of each input and output of a component.

29. A method according to claim 28, wherein the map of dependencies is checked to determine whether use of a particular component type in a graphical definition of the formula will create a circular reference between different hierarchical levels of the logical definition.

30. A method according to claim 3, wherein the graphical objects which are grouped into the new component are graphically displayed according to the sub-set of the graphical definition when a user requesting the display has adequate privileges.

31. A method according to claim 1, wherein the logical definition comprises an interface definition which defines how an instance of the functionality of the new component object interacts with other objects in the graphically defined formula.

32. One or more processor-readable storage devices having processor-readable code, the processor-readable code which, when executed by one or more processors, performs a method of graphically defining a formula, the method comprising:
displaying a graphically defined formula comprising one or more graphically connected graphical objects that graphically define the formula;
selecting one or more of the graphical objects to be grouped into a new component object;
determining the number of connections that provide an input to the selected objects;
determining the number of connections that provide an output from the selected objects;
determining a graphical definition of the formula, where the selected objects are replaced with a graphical representation of the new component object having a number of inputs based on the determined number of connections that provide an input and a number of outputs based on the determined number of connections that provide an output, one of more of the connections inputting to the selected objects from non-selected objects are replaced with one or more connections connecting to the input(s) of the new component object and one or more connections outputting from the selected objects to the non-selected objects are replaced with one or more connections connecting from the output(s) of the new component object;
determining a logical definition of the formula which non-graphically describes the functionality of the formula represented by the graphical objects in the graphically defined formula, based on the graphically connected graphical objects and the selection of one or more of the graphical objects, the logical definition of the formula excluding information necessary to display the graphically defined formula, wherein the selected objects are retained in the logical definition; and
determining the input/output properties of connections that connect to the selected objects, and providing each input of the new component object with the properties of the corresponding connection inputting the selected objects and providing each output of the new component object with the properties of the corresponding connection outputting from the selected objects.

33. One or more processor-readable storage devices having processor-readable code, the processor-readable code which, when executed by one or more processors, performs a method of graphically defining a formula, the method comprising:
displaying a graphically defined formula comprising a plurality of graphically connected graphical objects that graphically define the formula, the graphically defined formula having a logical definition and a graphical definition;
selecting one or more of the graphical objects to be grouped into a new component object;
determining the number of connections that provide an input to the selected objects;
determining a number of new component inputs from the number of connections that provide an input to the selected objects and reducing this number by each extra input beyond the first which are connected together;
determining the number of connections that provide an output from the selected objects;
determining a number of new component outputs from the number of connections that provide an output from the selected objects and reducing this number by each extra output beyond the first which are connected together;
changing the graphical definition to replace the selected objects with a graphical representation of the new component object having the determined number of new component inputs and the determined number of new component outputs, changing any connections inputting to the selected objects from non-selected objects into a respective connections connecting to the input(s) of the new component object and changing any connections outputting from the selected objects to the non-selected objects into a respective connections connecting to the output(s) of the new component object; and
changing the logical definition to non-graphically describe the functionality of the formula represented by the graphical objects in the graphically defined formula based on the graphically connected graphical objects and the selection of one or more of the graphical objects, the logical definition of the formula excluding information necessary to display the graphically defined formula, wherein the logical definition reflects connections between the new component object and the selected components.

34. A computer-based system for graphically defining a formula comprising:
means for displaying a graphically defined formula comprising a plurality of graphically connected graphical objects that graphically define the formula, the graphically defined formula having a logical definition and a graphical definition;
means for selecting one or more of the graphical objects to be grouped into a new component object;
means for determining the number of connections that provide an input to the selected objects;
means for determining a number of new component inputs from the number of connections that provide an input to the selected objects and reducing this number by each extra input beyond the first which are connected together;
means for determining the number of connections that provide an output from the selected objects;
means for determining a number of new component outputs from the number of connections that provide an output from the selected objects and reducing this number by each extra output beyond the first which are connected together;

means for changing the graphical definition to replace the selected objects with a graphical representation of the new component object having the determined number of new component inputs and the determined number of new component outputs, changing any connections inputting to the selected objects from non-selected objects into a respective connections connecting to the input(s) of the new component object and changing any connections outputting from the selected objects to the non-selected objects into a respective connections connecting to the output(s) of the new component object; and means for changing the logical definition to non-graphically describe the functionality of the formula represented by the graphical objects in the graphically defined formula based on the graphically connected graphical objects and the selection of one or more of the graphical objects, the logical definition of the formula excluding information necessary to display the graphically defined formula, wherein the logical definition reflects connections between the new component object and the selected components.

35. A computer-based system for graphically defining a formula comprising:

means for displaying a graphically defined formula comprising one or more graphically connected graphical objects that graphically define the formula; means for selecting one or more of the graphical objects to be included in the functionality of a new component type;

means for determining the number of connections that provide an input to the selected objects;

means for determining the number of connections that provide an output from the selected objects;

means for determining input/output properties of connections that connect to the selected object, and providing each input of the new component object with the properties of the corresponding connection inputting the selected objects and providing each output of the new component object with the properties of the corresponding connection outputting from the selection objects;

means for determining a graphical definition of the formula, where the selected objects are replaced with a graphical representation of the new component object having a number of inputs based on the determined number of connections that provide an input and a number of outputs based on the determined number of connections that provide and output, one or more of the connections inputting to the selected objects from non-selected objects are replaced with one or more connections connecting to the input(s) of the new component object and one or more of the connections outputting from the selected objects to the non-selected objects are replaced with one or more connections connecting from the output(s) of the new component object; and means for determining a logical definition of the formula, which non-graphically describes the functionality of the formula represented by the graphical objects in the graphically defined formula based on the graphically connected graphical objects and the selection of one or more of the graphical objects, the logical definition of the formula excluding information necessary to display the graphically defined formula, wherein the selected objects are retained in the logical definition.

* * * * *

UNITED STATES PATENT AND TRADEMARK OFFICE
CERTIFICATE OF CORRECTION

PATENT NO. : 7,644,370 B2
APPLICATION NO. : 11/141991
DATED : January 5, 2010
INVENTOR(S) : Christopher Ian Bargh et al.

It is certified that error appears in the above-identified patent and that said Letters Patent is hereby corrected as shown below:

At Column 11, Line 42, after "to" insert --the--.

At Column 11, Line 43, delete "sent" and insert therefore --set--.

At Column 14, Line 32, delete "352" and insert therefore --352,--.

At Column 14, Line 43, delete "358" and insert therefore --358,--.

At Columns 15-16, Line 6, delete "Component" />" and insert therefore --Component"/>--.

At Columns 15-16, Line 75, above "<?xml version = "1.0"?>" insert --APPENDIX 2--.

At Columns 17-18, Line 1, delete "APPENDIX 1" and insert therefore --APPENDIX 2--.

At Columns 17-18, Lines 11-16, delete

"NDI0RDE2MDUwDAwMDAWMDAwMDAzNjAwMDAwMDI4MDAwMDAwMTgwMDAwMDA
wRDAwMDAwMDAxMDAyMDAwMDAwMDAwMDBFMDA0MDAwMDAwMDAwMDAwMDAwMDA
256
<data omitted for space>
kZGRkZGMDBGRkZGRVYwMEZGRkZGRjAwRkZGRkZGMDBGRkrGBkYwMEZGPkZGR.
jAwRkZGRkZGMDEGRkZGRkYwMEZGRkZGRjAw"/>"

and insert therefore

"NDI0RDE2MDUwMDAwMDAwMDAwMDAzNjAwMDAwMDI4MDAwMDAwMTgwMDAwMDA
wRDAwMDAwMDAxMDAyMDAwMDAwMDAwMDBFMDA0MDAwMDAwMDAwMDAwMDAwMDA
256
<data omitted for space>
kZGRkZGMDBGRkZGRVYwMEZGRkZGRjAwRkZGRkZGMDBGRktGRkYwMEZGRkZGR.
jAwRkZGRkZGMDEGRkZGRkYwMEZGRkZGRjAw"/>--.

Signed and Sealed this

Thirtieth Day of November, 2010

David J. Kappos
*Director of the United States Patent and Trademark Office*

CERTIFICATE OF CORRECTION (continued)
U.S. Pat. No. 7,644,370 B2

At Columns 17-18, Line 52, delete "Name "Operation"" and insert therefore --Name = "Operation"--.

At Columns 17-18, Line 55, delete "=, "Left"" and insert therefore --= "Left"--.

At Columns 17-18, Line 57, delete ""Number" Value "0"/>" and insert therefore --"Number" Value = "0"/>--.

At Columns 17-18, Line 59, delete ""Text" Value "Initial"/>" and insert therefore --"Text" Value = "Initial"/>--.

At Columns 17-18, Line 66, delete "Value "00"" and insert therefore --Value = "00"--.

At Columns 17-18, Line 73, delete ""I0""and insert therefore --"I0"--.

At Columns 19-20, Line 1, delete "APPENDIX 1" and insert therefore --APPENDIX 2--.

At Columns 19-20, Line 43, delete "Initial "0"/>" and insert therefore --Initial = "0"/>--.

At Columns 19-20, Line 57, delete "OutputCTID "00"" and insert therefore --OutputCTID = "00"--.

At Columns 19-20, Line 58, delete "10-0" and insert therefore --I0-0--.

At Columns 19-20, Line 60, delete "To "23"" and insert therefore --To = "23"--.

At Columns 21-22, Line 1, delete "APPENDIX 1" and insert therefore --APPENDIX 2--.

At Columns 21-22, Line 2, delete "10-1" and insert therefore --I0-1--.

At Columns 21-22, Line 3, delete "Type "Output"" and insert therefore --Type = "Output"--.

At Column 22, Line 52, Claim 6, delete "levels" and insert therefore --level--.

At Column 23, Line 59, Claim 13, delete "object," and insert therefore --objects,--.

At Column 24, Line 29, Claim 20, after "undefined" delete "the".

UNITED STATES PATENT AND TRADEMARK OFFICE
CERTIFICATE OF CORRECTION

PATENT NO.       : 7,644,370 B2  Page 1 of 1
APPLICATION NO.  : 11/141991
DATED            : January 5, 2010
INVENTOR(S)      : Bargh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1069 days.

Signed and Sealed this

Twenty-first Day of December, 2010

David J. Kappos
*Director of the United States Patent and Trademark Office*